(12) United States Patent
Sudo et al.

(10) Patent No.: US 9,947,352 B1
(45) Date of Patent: Apr. 17, 2018

(54) MAGNETIC DISK APPARATUS

(71) Applicant: Kabushiki Kaisha Toshiba, Minato-ku, Tokyo (JP)

(72) Inventors: Daisuke Sudo, Yokohama Kanagawa (JP); Takeyori Hara, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/668,888

(22) Filed: Aug. 4, 2017

(30) Foreign Application Priority Data

Mar. 17, 2017 (JP) ................................. 2017-052225

(51) Int. Cl.
  *G11B 5/09* (2006.01)
  *G11B 5/55* (2006.01)

(52) U.S. Cl.
  CPC ................................. *G11B 5/5547* (2013.01)

(58) Field of Classification Search
  None
  See application file for complete search history.

(56) References Cited

U.S. PATENT DOCUMENTS

| 5,119,250 | A | | 6/1992 | Green et al. | |
|---|---|---|---|---|---|
| 5,781,363 | A | * | 7/1998 | Rowan | G11B 5/5534 360/75 |
| 5,793,558 | A | * | 8/1998 | Codilian | G11B 21/083 360/78.06 |
| 6,154,340 | A | * | 11/2000 | Cameron | G11B 5/6005 360/75 |
| 6,229,663 | B1 | | 5/2001 | Yoneda et al. | |
| 2002/0054450 | A1 | * | 5/2002 | Chu | G11B 5/5547 360/78.06 |
| 2003/0048571 | A1 | * | 3/2003 | Soyama | G11B 33/1406 360/78.06 |
| 2005/0013037 | A1 | * | 1/2005 | Tanner | G11B 5/5526 360/78.04 |
| 2005/0134997 | A1 | | 6/2005 | Chu et al. | |
| 2006/0034009 | A1 | * | 2/2006 | Maiocchi | G11B 5/5547 360/77.02 |
| 2006/0268449 | A1 | * | 11/2006 | Chu | G11B 5/5547 360/78.06 |
| 2011/0019299 | A1 | | 1/2011 | Yasunaka et al. | |
| 2012/0075742 | A1 | | 3/2012 | Takakura et al. | |

FOREIGN PATENT DOCUMENTS

JP  05-089613 A  4/1993
JP  2012-074098 A  4/2012

* cited by examiner

*Primary Examiner* — Peter Vincent Agustin
(74) *Attorney, Agent, or Firm* — White & Case LLP

(57) ABSTRACT

According to one embodiment, a VCM resistance estimation unit estimates a VCM resistance in a voice coil motor based on an acceleration and a velocity of a magnetic head with a VCM voltage saturated, and an equivalent current force constant estimation unit estimates an equivalent current force constant of the voice coil motor based on the acceleration and the velocity of the magnetic head with the VCM voltage saturated.

19 Claims, 7 Drawing Sheets

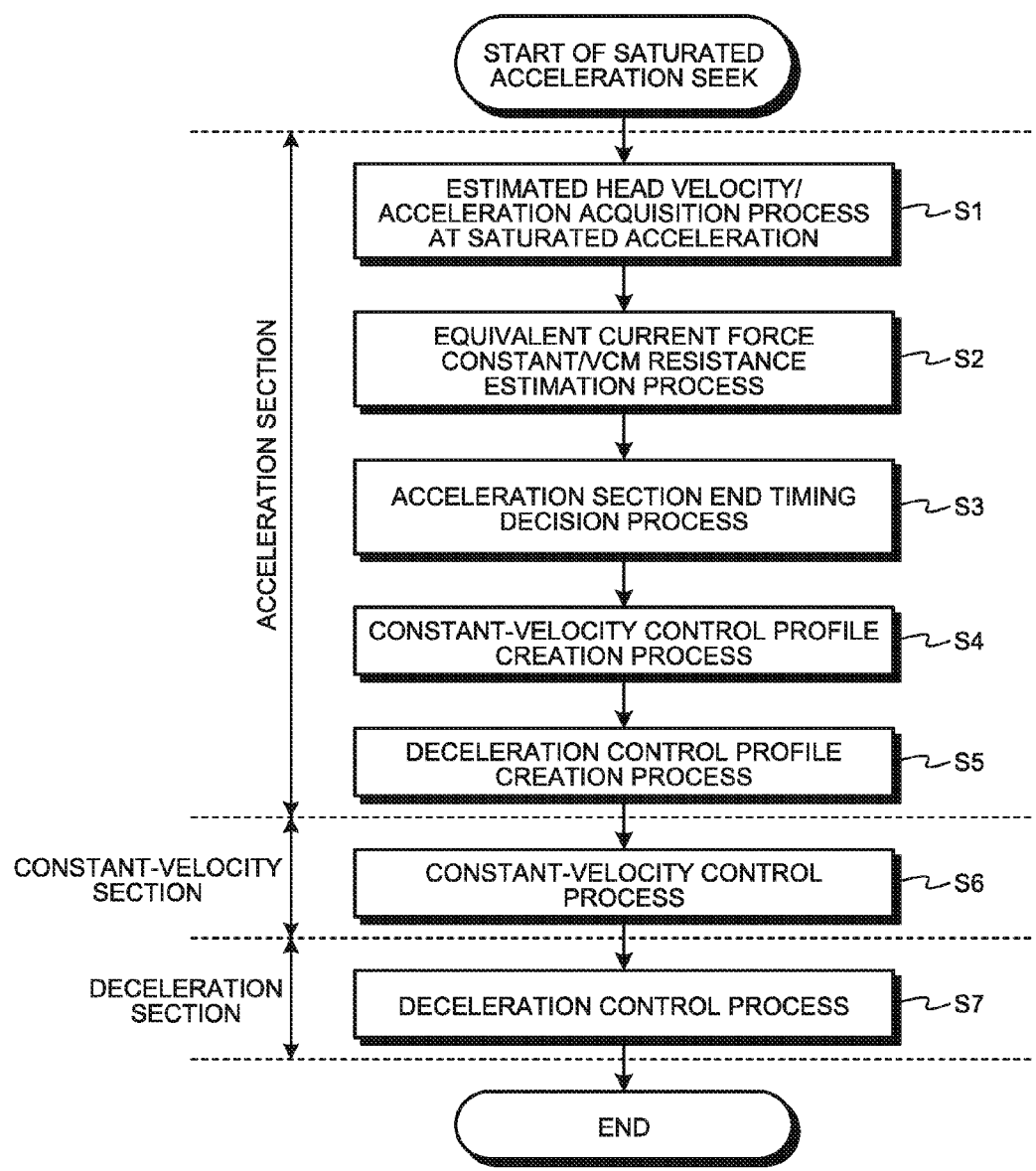

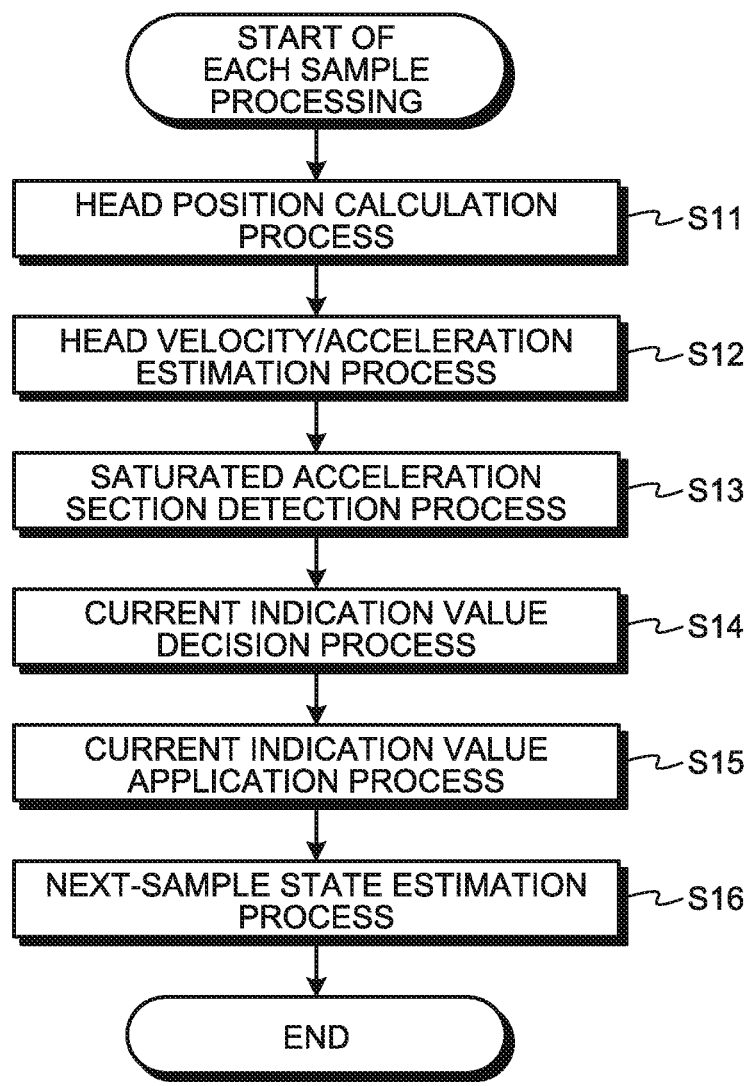

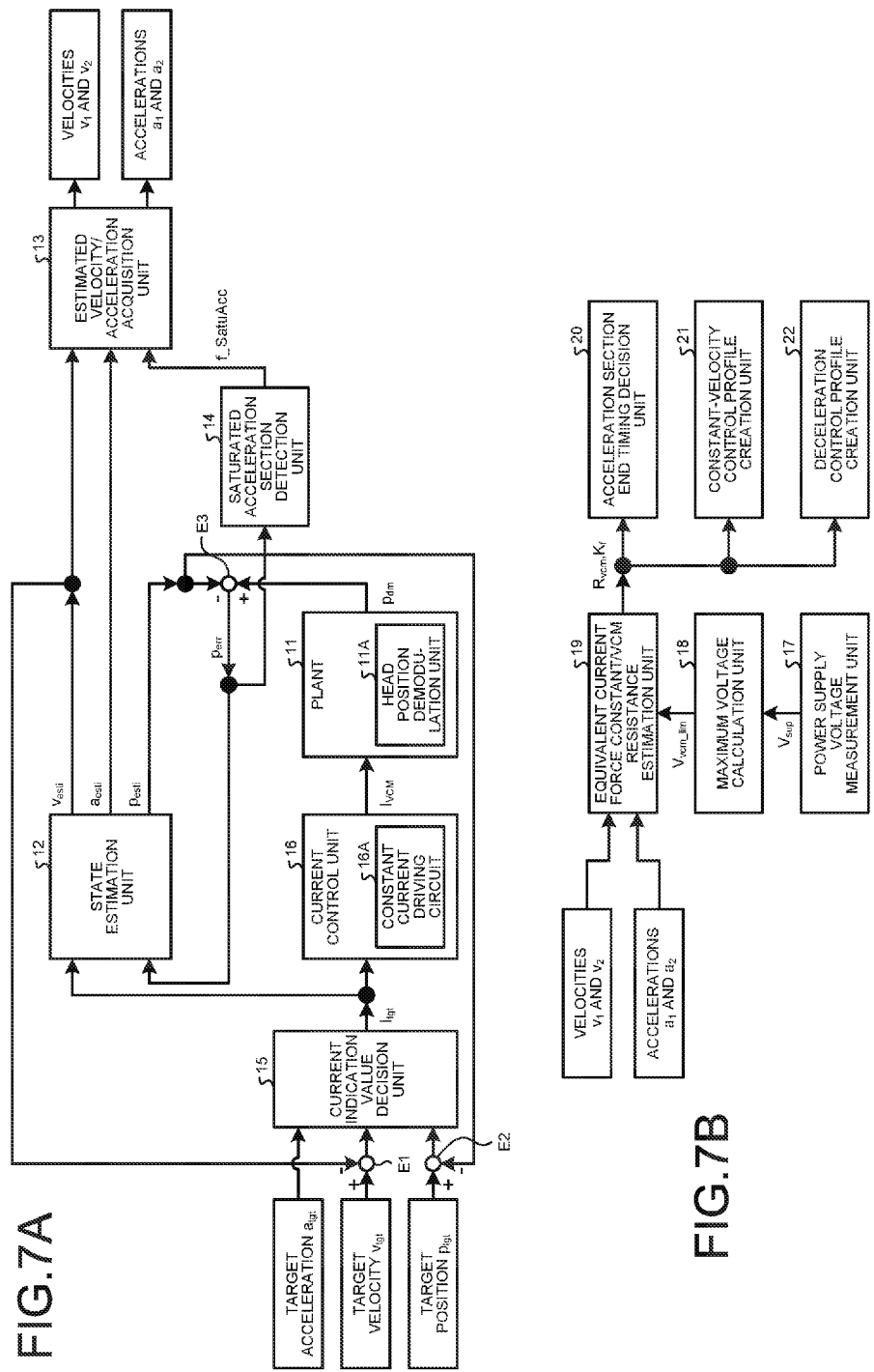

… (1)

MAGNETIC DISK APPARATUS

CROSS-REFERENCE TO RELATED APPLICATIONS

This application is based upon and claims the benefit of priority from Japanese Patent Application No. 2017-52225, filed on Mar. 17, 2017; the entire contents of which are incorporated herein by reference.

FIELD

Embodiments described herein relate generally to a magnetic disk apparatus.

BACKGROUND

In a magnetic disk apparatus, a seek control may become unstable when a VCM resistance changes due to heat generation during a seek or an equivalent current constant changes due to variations in properties among components and environmental changes.

BRIEF DESCRIPTION OF THE DRAWINGS

FIG. 5 is a flowchart of a saturated acceleration seek process in the magnetic disk apparatus according to the embodiment;

FIG. 6 is a flowchart of each sample processing during a saturated acceleration seek in the magnetic disk apparatus according to the embodiment; and FIG. 7A is a schematic block diagram of the foreground of a seek processing system in the magnetic disk apparatus according to the embodiment, and FIG. 7B is a schematic block diagram of the background of the seek processing system in the magnetic disk apparatus according to the embodiment.

DETAILED DESCRIPTION

In general, according to one embodiment, a magnetic disk apparatus includes a magnetic disk, a magnetic head, a voice coil motor, a driving circuit, a VCM resistance estimation unit, and an equivalent current force constant estimation unit. The magnetic head accesses the magnetic disk. The voice coil motor drives the magnetic head over the magnetic disk. The driving circuit applies a VCM current to the voice coil motor. The VCM resistance estimation unit estimates a VCM resistance in the voice coil motor based on an acceleration and a velocity of the magnetic head with a VCM voltage saturated. The equivalent current force constant estimation unit estimates the equivalent current force constant of the voice coil motor based on the acceleration and the velocity of the magnetic head with the VCM voltage saturated.

Exemplary embodiments of a magnetic disk apparatus will be explained below in detail with reference to the accompanying drawings. The present invention is not limited to the following embodiments.

Figure 1A:
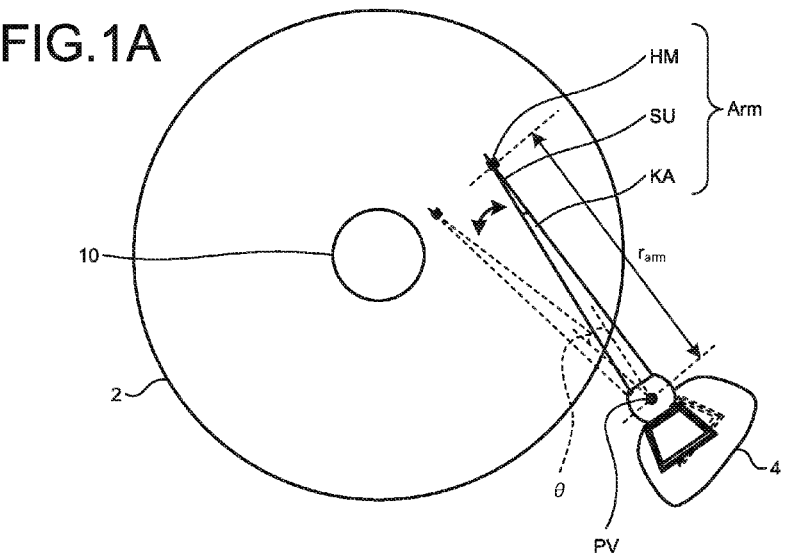
FIG. 1A is a plane view illustrating a seek action of a magnetic head over a magnetic disk according to an embodiment.
Figure 1B:
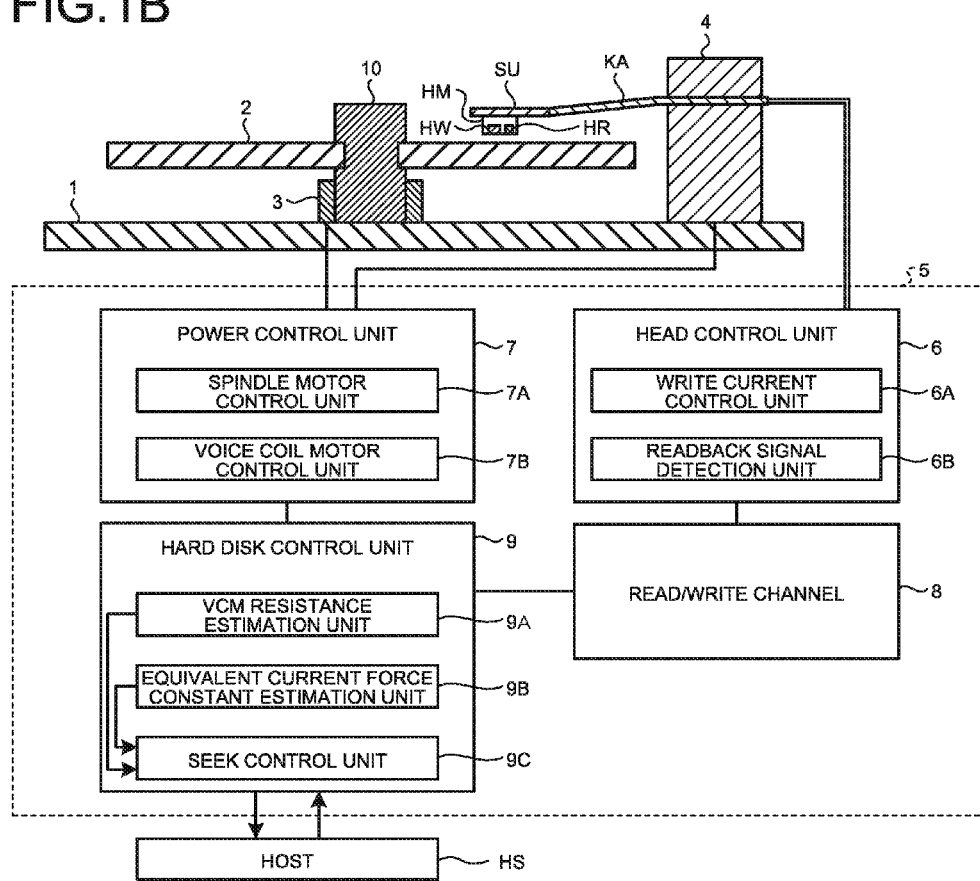
FIG. 1B is a schematic block diagram of a magnetic disk apparatus according to the embodiment.

FIG. 1A is a plane view illustrating a seek action of a magnetic head over a magnetic disk according to an embodiment, and FIG. 1B is a schematic block diagram of a magnetic disk apparatus according to the embodiment.

Referring to FIGS. 1A and 1B, the magnetic disk apparatus has a magnetic disk 2 that is supported by a housing 1 via a spindle 10.

The magnetic disk apparatus also has a head slider HM. The head slider HM has a write head HW and a read head HR as magnetic heads. The write head HW and the read head HR are opposed to the magnetic disk 2. The head slider HM is held over the magnetic disk 2 via a suspension SU and a carriage arm KA. The carriage arm KA is slidable on the head slider HM in a horizontal plane at a seek time or the like. The suspension SU applies a pressing force to the magnetic head against the floating force of the magnetic head resulting from an air flow with the rotation of the magnetic disk 2, thereby to keep constant the floating amount of the magnetic head over the magnetic disk 2. The suspension SU can be formed from a plate spring.

The magnetic disk apparatus also has a voice coil motor 4 that drives the carriage arm KR and a spindle motor 3 that rotates the magnetic disk 2 around the spindle 10. The voice coil motor 4 and the spindle motor 3 are fixed to the housing 1.

The magnetic disk apparatus also has a control unit 5 that controls the operations of the magnetic disk apparatus. The control unit 5 can control the positions of the write head HW and the read head HR with respect to the magnetic disk 2 based on the servo data read by the read head HR. The control unit 5 has a head control unit 6, a power control unit 7, a read/write channel 8, and a hard disk control unit 9.

The head control unit 6 has a write current control unit 6A and a readback signal detection unit 6B. The power control unit 7 has a spindle motor control unit 7A and a voice coil motor control unit 7B.

The head control unit 6 amplifies or detects a signal at the time of recording and reading. The write current control unit 6A controls a write current flowing through the write head HW. The readback signal detection unit 6B detects the signal read by the read head HR.

The power control unit 7 drives the voice coil motor 4 and the spindle motor 3. The spindle motor control unit 7A controls the rotation of the spindle motor 3. The voice coil motor control unit 7B controls driving of the voice coil motor 4. In this case, the voice coil motor control unit 7B can control a voice coil motor (VCM) current flowing into the coil in the voice coil motor 4.

The read/write channel 8 passes data between the head control unit 6 and the hard disk control unit 9. The data includes read data, write data, and servo data. For example, the read/write channel 8 converts the signal to be read by the read head HR into a data format that can be handled by a host HS or converts the data output from the host HS into a signal format that can be recorded on the write head HW. The format conversion includes DA conversion, encoding, AD conversion, and decoding. The read/write channel 8 also decodes the signal read by the read head HR and subjects the data output from the host HS to code modulation.

The hard disk control unit 9 controls recording and reading under instructions from the outside of the magnetic disk apparatus (for example, the host HS) and passes data between the outside and the read/write channel 8. The hard disk control unit 9 has a VCM resistance estimation unit 9A, an equivalent current force constant estimation unit 9B, and a seek control unit 9C. The VCM resistance estimation unit 9A, the equivalent current force constant estimation unit 9B, and the seek control unit 9C can be implemented by firmware.

The VCM resistance estimation unit 9A can estimate a VCM resistance in the voice coil motor 4 based on an acceleration and a velocity of the magnetic head with a VCM voltage saturated. The VCM resistance is a coil resistance in the voice coil motor 4. The saturated state of the VCM voltage refers to the state in which the VCM voltage in the voice coil motor 4 does not increase even with increase in a current indication value of the VCM current in the voice coil motor 4. The equivalent current force constant estimation unit 9B can estimate an equivalent current force constant of the voice coil motor 4 based on the acceleration and the velocity of the magnetic head with the VCM voltage saturated. The equivalent current force constant is a value that is used equivalently with a current torque constant of a rotary motion system, in a translational motion system equivalently converted from the rotary motion system. The seek control unit 9C can perform a seek control based on the VCM resistance and the equivalent current force constant of the voice coil motor 4.

The hard disk control unit 9 may have separately a processor that controls recording and reading and a processor that controls passing of data between the host HS and the read/write channel 8. Alternatively, the same processor may be used for recording and reading control and data passage control. The processor can be a CPU.

The control unit 5 is connected to the host HS. The host HS may be a personal computer that issues a write command and a read command to the magnetic disk apparatus or a network connectable to a server or the like. That is, the magnetic disk apparatus can be used as an external storage apparatus for the host HS. The magnetic disk apparatus may be externally attached to the host HS or may be built in the host HS.

While the spindle motor 3 rotates the magnetic disk 2, the magnetic head reads a signal from the magnetic disk 2 and the readback signal detection unit 6B detects the signal. The read/write channel 8 subjects the signal detected by the readback signal detection unit 6B to data conversion and sends the same to the hard disk control unit 9. The hard disk control unit 9 performs a tracking control on the magnetic head based on a burst pattern included in the signal detected by the readback signal detection unit 6B.

The demodulation position of the magnetic head is calculated based on the sector/cylinder information included in the signal detected by the readback signal detection unit 6B to predict the current position of the magnetic head, and the magnetic head is brought into a seek control to come close to the target position.

Under a seek control, the profile of the VCM current can be set to allow the magnetic head to reach the target position of the seek destination from the present position. At the target position of the seek destination, the acceleration and the velocity of the magnetic head at a seek time can be set to 0. The profile of the VCM current can be set using the VCM resistance estimated by the VCM resistance estimation unit 9A and the equivalent current force constant estimated by the equivalent current force constant estimation unit 9B.

Estimating the VCM resistance and the equivalent current force constant of the voice coil motor 4 based on the acceleration and the velocity of the magnetic head with the VCM voltage saturated makes it possible to estimate the VCM resistance in the voice coil motor 4 based on the maximum VCM voltage applicable to the voice coil motor 4. Accordingly, the VCM resistance in the voice coil motor 4 can be estimated without measuring the voltage between terminals of the voice coil motor 4, which eliminates the attachment of a voltage sensor to the voice coil motor 4.

By estimating the VCM resistance in the voice coil motor 4 based on the acceleration and the velocity of the magnetic head with the VCM voltage saturated, it is possible to improve the accuracy of calculation of the VCM resistance as compared to the method by which to correct the temperature dependency of the VCM resistance based on the temperature measured by a system on chip (SoC) or integrated circuit (IC) temperature sensor in the magnetic disk apparatus.

By setting the profile of the VCM current at a seek time based on the VCM resistance and the equivalent current force constant of the voice coil motor 4, it is possible to improve the precision of the acceleration and the velocity of the magnetic head from the present position to the seek destination. This reduces a margin of arrival time of the magnetic head from the present position to the seek destination, thereby shortening a seek time.

A method for estimating the VCM resistance and equivalent current force constant of the magnetic disk according to the embodiment will be described below in detail with the use of equations.

Used in the following description is a model in which the rotary motion system illustrated in FIG. 1A is equivalently converted into a translational motion system. When the rotation angle of an arm Arm is designated as θ, the relationship between a VCM current $I_{VCM}$ flowing into the voice coil motor 4 and an angular acceleration θ" of the arm Arm can be given by Equation (1) as follows:

$$\theta'' = K_t / J \cdot I_{VCM} \tag{1}$$

where $K_t$ [N·m/A] represents a current torque constant and J [kg·m²] represents the moment of inertia of the arm Arm. The arm Arm can include the head slider HM, the suspension SU, and the carriage arm KA illustrated in FIG. 1A.

With an approximation that the magnetic head makes translational motion to the radial direction of the magnetic disk 2, an equivalent current force constant $K_f$ [N/A] and a mass m [kg] equivalent to the current torque constant $K_t$ and the moment of inertia J of the arm Arm will be discussed. In this case, the equivalent current force constant $K_f$ and the mass m can be given by Equations (2) and (3) as follows:

$$K_f = K_t / r_{arm} \tag{2}$$

$$m = J / r^2_{arm} \tag{3}$$

where $r_{arm}$ represents arm length that is the distance between the magnetic head and a pivot PV.

The relationship between the VCM current $I_{VCM}$ flowing into the voice coil motor 4 and the acceleration a of the arm Arm can be given by Equation (4) as follows:

$$a = K_f/m \cdot I_{VCM} \quad (4)$$

Figure 2A:
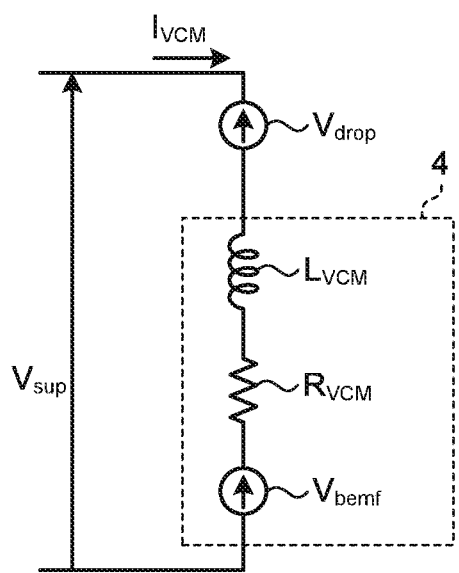
FIG. 2A is a diagram schematically illustrating an equivalent circuit with major changes in current in a voice coil motor illustrated in FIG. 1.
Figure 2B:
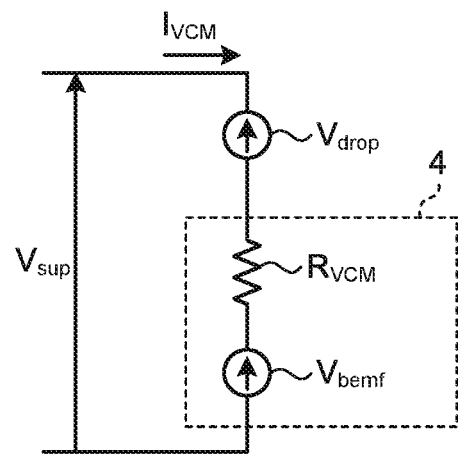
FIG. 2B is a diagram schematically illustrating an equivalent circuit with minor changes in current in the voice coil motor illustrated in FIG. 1.

FIG. 2A is a diagram schematically illustrating an equivalent circuit with a major current change in the voice coil motor illustrated in FIG. 1, and FIG. 2B is a diagram schematically illustrating an equivalent circuit with a minor current change in the voice coil motor illustrated in FIG. 1.

Referring to FIG. 2A, the equivalent circuit of the voice coil motor 4 can be expressed by a series circuit of a VCM resistance $R_{VCM}$ and an inductance $I_{VCM}$. In this case, when a power supply voltage $V_{sup}$ is applied to the voice coil motor 4 to flow the VCM current $I_{VCM}$, a back electro motive force (BEMF) occurs and a back electro motive voltage $V_{bemf}$ is generated by the velocity v of the arm Arm.

The back electro motive voltage $V_{bemf}$ can be given by Equation (6) as follows:

$$V_{bemf} = K_f v \quad (6)$$

In this case, a VCM circuit equation can be given by Equation (7) as follows:

$$V_{sup} = V_{drop} + I_{VCM} R_{VCM} + L_{VCM} dI_{VCM} + V_{bemf} \quad (7)$$

where $V_{drop}$ represents a known voltage drop due to a circuit resistance such as an amp-on resistance.

Meanwhile, with a minor current change in the voice coil motor 4, the inductance $L_{VCM}$ can be omitted as illustrated in FIG. 2B. Saturation acceleration can be assumed in this equivalent circuit.

Without allowing for the back electro motive voltage $V_{bemf}$ and the inductance $L_{VCM}$, a maximum applicable VCM voltage $V_{VCM\_lim}$ of the voice coil motor 4 can be given by Equation (8) as follows:

$$V_{VCM\_lim} = V_{sup} - V_{drop} \quad (8)$$

As apparent from Equation (8), when the voltage drop $V_{drop}$ due to a circuit resistance has a fixed value, the maximum applicable VCM voltage $V_{VCM\_lim}$ depends only on the power supply voltage $V_{sup}$ without dependence on the magnitude of the current change in the voice coil motor 4.

Even when the back electro motive voltage $V_{bemf}$ is generated in the voice coil motor 4 due to the velocity v of the arm Arm, the constant current driving circuit operates such that the indicated current value flows into the voice coil motor 4 as far as the back electro motive voltage $V_{bemf}$ falls within the range of the maximum applicable VCM voltage $V_{VCM\_lim}$.

The seek with the VCM voltage saturated in a seek acceleration section is called saturated acceleration seek. The current flowing during the saturated acceleration seek is called saturated current, and the acceleration during the saturated acceleration seek is called saturated acceleration. When the VCM voltage is saturated, the current change rate per unit time is low and the inductance term in Equation (7) can be ignored.

In this case, a saturated current I can be given by Equation (9) based on Equation as follows:

$$I = (V_{VCM\_lim} - V_{bemf})/R_{VCM} \quad (9)$$

A saturated acceleration a can be given by Equation (10) based on Equations (4) and (9) as follows:

$$a = K_f/m \cdot (V_{VCM\_lim} - V_{bemf})/R_{VCM} \quad (10)$$

As understood from Equations (9) and (10), the saturated current I and the saturated acceleration a are limited by the maximum applicable VCM voltage $V_{VCM\_lim}$, and are determined by the back electro motive voltage $V_{bemf}$ depending on the velocity of the magnetic head. When the saturated acceleration seek is selected, the acceleration section includes a section in which a current indication value is given to operate the constant current driving circuit such that the power supply voltage $V_{sup}$ exceeds the maximum applicable VCM voltage $V_{VCM\_lim}$.

The saturated acceleration seek will be described below in detail.

Figure 3A:
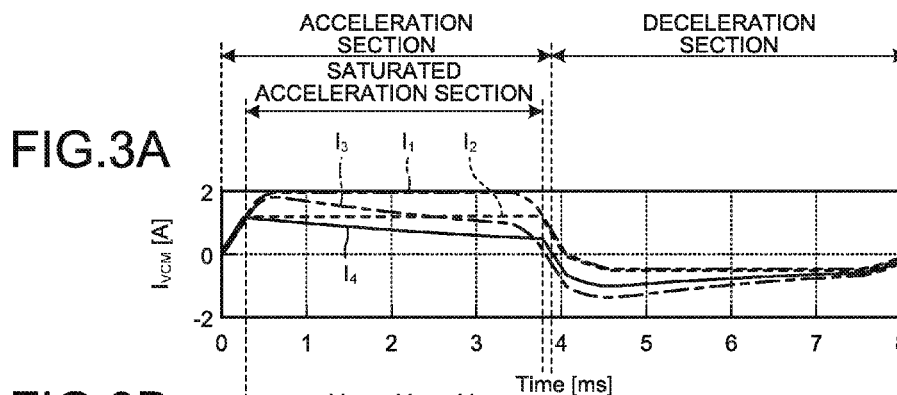
FIG. 3A is a diagram of a waveform of a VCM current during a saturated acceleration seek.
Figure 3B:
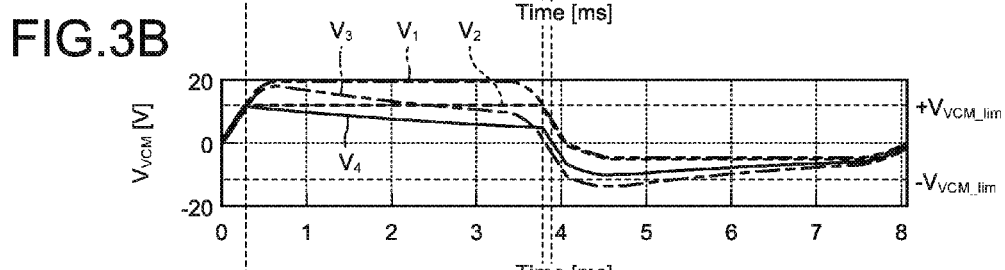
FIG. 3B is a diagram of a waveform of a VCM voltage during a saturated acceleration seek.
Figure 3C:
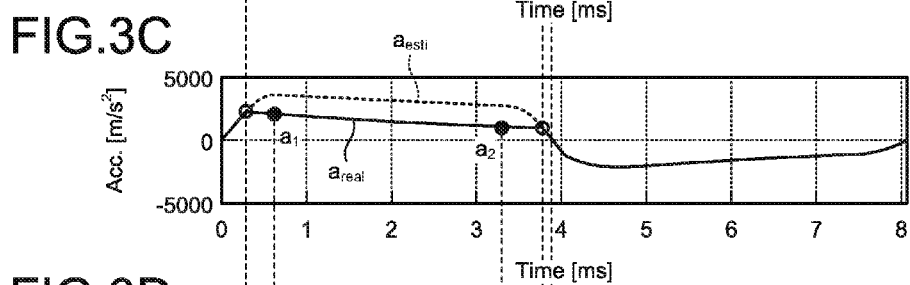
FIG. 3C is a diagram of temporal changes in the acceleration of the magnetic head during a saturated acceleration seek.
Figure 3D:
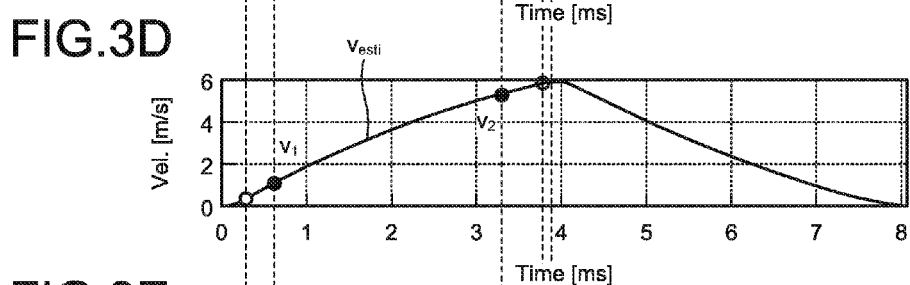
FIG. 3D is a diagram of temporal changes in the velocity of the magnetic head during a saturated acceleration seek.
Figure 3E:
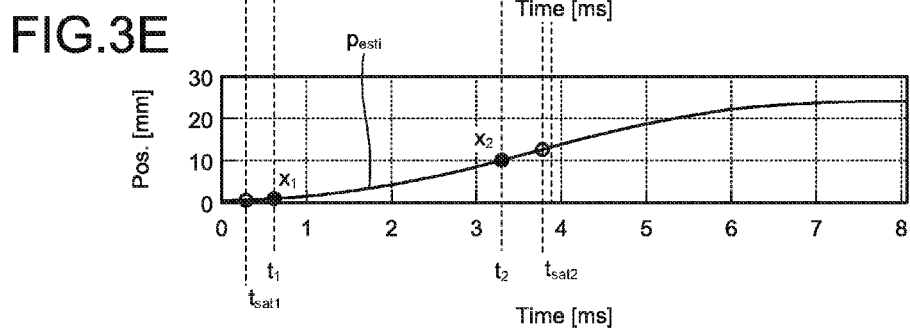
FIG. 3E is a diagram of temporal changes in the position of the magnetic head during a saturated acceleration seek.

FIG. 3A is a diagram of a waveform of a VCM current during the saturated acceleration seek, FIG. 3B is a diagram of a waveform of a VCM voltage during the saturated acceleration seek, FIG. 3C is a diagram of temporal changes in the acceleration of the magnetic head during the saturated acceleration seek, FIG. 3D is a diagram of temporal changes in the velocity of the magnetic head during the saturated acceleration seek, and FIG. 3E is a diagram of temporal changes in the position of the magnetic head during the saturated acceleration seek.

Referring to FIGS. 3A and 3B, a VCM current $I_1$ and a VCM voltage $V_1$ are in the case where the saturation of the VCM voltage $V_{VCM}$ and the back electro motive voltage $V_{bemf}$ are not allowed for. A VCM current $I_2$ and a VCM voltage $V_2$ are in the case where the saturation of the VCM voltage $V_{VCM}$ is allowed for but the back electro motive voltage $V_{bemf}$ is not allowed for. A VCM current $I_3$ and a VCM voltage $V_3$ are in the case where the saturation of the VCM voltage $V_{VCM}$ is not allowed for but the back electro motive voltage $V_{bemf}$ is allowed for. A VCM current $I_4$ and a VCM voltage $V_4$ are in the case where the saturation of the VCM voltage $V_{VCM}$ and the back electro motive voltage $V_{bemf}$ are allowed for.

In the saturated acceleration section, when the saturation of the VCM voltage $V_{VCM}$ is not allowed for, the VCM voltages $V_1$ and $V_3$ can exceed the maximum applicable VCM voltage $V_{VCM\_lim}$. When the saturation of the VCM voltage $V_{VCM}$ is allowed for, the VCM voltages $V_2$ and $V_4$ are limited to the maximum applicable VCM voltage $V_{VCM\_lim}$ even though the power supply voltage $V_{sup}$ is given to exceed the maximum applicable VCM voltage $V_{VCM\_lim}$. Along with the limitation of the VCM voltages $V_2$ and $V_4$ by the maximum applicable VCM voltage $V_{VCM\_lim}$, the VCM currents $I_2$ and $I_4$ are also limited.

In the saturated acceleration section, when the back electro motive voltage $V_{bemf}$ is not allowed for, the VCM voltages $V_1$ and $V_2$ do not drop due to the back electro motive voltage $V_{bemf}$. When the back electromotive voltage $V_{bemf}$ is allowed for, the VCM voltages drop due to the back electro motive voltage $V_{bemf}$. Along with the drop of the VCM voltages $V_3$ and $V_4$ by the back electro motive voltage $V_{bemf}$, the VCM currents $I_3$, and $I_4$ also decrease.

In the saturated acceleration seek, the saturated acceleration section can be set between a time $t_{sat1}$ when the VCM voltage $V_{VCM}$ exceeds the maximum applicable VCM voltage $V_{VCM\_lim}$ and a time $t_{sat2}$ when the VCM voltage $V_{VCM}$ becomes under the maximum applicable VCM voltage $V_{VCM\_lim}$. When the VCM voltage $V_{VCM}$ exceeds the maximum applicable VCM voltage $V_{VCM\_lim}$ the VCM voltage $V_{VCM}$ becomes saturated. When the VCM voltage $V_{VCM}$ becomes under the maximum applicable VCM voltage $V_{VCM\_lim}$, the VCM voltage $V_{VCM}$ becomes unsaturated.

In the saturated acceleration seek, a current indication value can be given to operate the constant current driving circuit in the voice coil motor 4 such that the VCM voltage $V_{VCM}$ exceeds the maximum applicable VCM voltage $V_{VCM\_lim}$. In this case, the VCM current $I_1$ can be given as the current indication value. Accordingly, in the saturated acceleration seek, the VCM currents $I_2$ and $I_4$ corresponding to the saturated. VCM voltages $V_2$ and $V_4$ diverge from the current indication value.

Referring to FIG. 3C, in the saturated acceleration section, a real acceleration $a_{real}$ of the magnetic head and an estimated acceleration $a_{esti}$ of the next sample diverge from each other. In this case, in the saturated acceleration seek, the next-sample estimation unit can provide feedback such that an estimated position error $p_{err}$ between a present position $p_{dm}$ of the magnetic head and an estimated position $p_{esti}$ of the next sample converges to 0.

For example, without the saturated acceleration control and the feedback from the next-sample state estimation unit, the estimated acceleration $a_{esti}$, an estimated velocity $v_{esti}$, and an estimated position $p_{esti}$ diverges increasingly with time from the real acceleration $a_{real}$, a real velocity $v_{real}$, and the present position $p_{dm}$, respectively.

Figure 4:
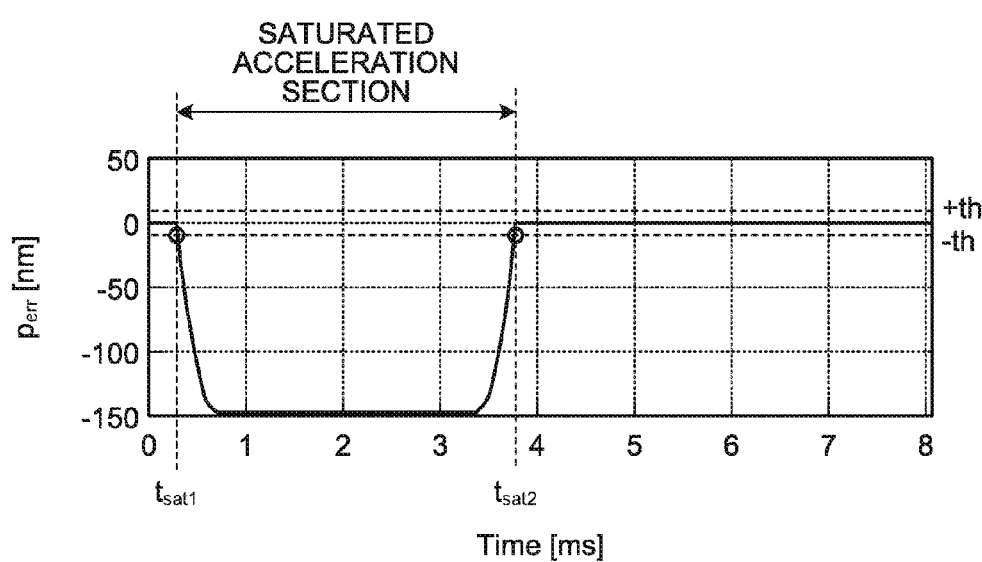
FIG. 4 is a diagram illustrating the difference between the actual position and the estimated position of the magnetic head during a saturated acceleration seek.

Meanwhile, with the saturated acceleration control and the feedback from the next-sample state estimation unit, it is possible to prevent increasing divergence between the real velocity $V_{real}$ and the estimated velocity $v_{esti}$ of the magnetic head during the saturated acceleration seek as illustrated in FIGS. 3E and 4 and prevent increase divergence between the real velocity and the estimated velocity of the magnetic head during the saturated acceleration seek illustrated in FIG. 3D. The next-sample state estimation unit can be the state estimation unit 12 illustrated in FIG. 7A.

As illustrated in FIGS. 3C to 3E, the VCM resistance $R_{VCM}$ and the equivalent current force constant $K_f$ can be determined based on accelerations $a_1$ and $a_2$ and velocities $v_1$ and $v_2$ of the magnetic head at positions $x_1$ and $x_2$ at different times $t_1$ and $t_2$ in the saturated acceleration section.

The VCM resistance $R_{VCM}$ and the equivalent current force constant $K_f$ can be given by Equations (11) and (12) as follows:

$$R_{VCM} = (a_1-a_2)(v_1-v_2)/(a_1 \cdot v_2 - a_2 \cdot v_1)^2 \cdot V^2_{VCM\_lim}/m \quad (11)$$

$$K_f = (a_1-a_2)/(a_1 \cdot v_2 - a_2 \cdot v_1) \cdot V_{VCM\_lim} \quad (12)$$

FIG. 4 is a diagram illustrating the difference between the actual position and the estimated position of the magnetic head during a saturated acceleration seek.

Referring to FIG. 4, in the saturated acceleration seek, feedback is provided such that the estimated position error $p_{err}$ between the present position $p_{dm}$ of the magnetic head and the estimated position $p_{esti}$ of the next sample converges to 0. Even though the feedback is provided, when there is a divergence between a current indication value $I_{tgt}$ and the VCM current $I_{VCM}$ actually flowing in the voice coil motor 4, the estimated position error $p_{err}$ does not become 0. Accordingly, the saturated acceleration section can be determined by monitoring whether the estimated position error $p_{err}$ falls within the range of the threshold±th during the acceleration seek and detecting times $t_{sat1}$ and $t_{sat2}$ when the estimated position error $p^{err}$ agrees with the threshold−th.

Providing feedback during the saturated acceleration seek as well reduces divergence between the present position $p_{dm}$ of the magnetic head and the estimated position $p_{esti}$ of the next sample. This makes it possible to improve the accuracy of the estimated position error $p_{err}$ and determine the saturated acceleration section from the estimated position error $p_{err}$.

The detection of the divergence between the actual state and the estimated state to determine the saturated acceleration section may be carried out using any of aspects, acceleration, velocity, and position, or using respective differences in the aspects, the squares of the differences, the accumulated values of the differences, the accumulated values of the squares of the differences, or the like.

The saturated acceleration section may be a predetermined saturated acceleration section or may be decided by the divergence between the estimated acceleration, the estimate velocity, or the estimated position calculated by the next-sample state estimation unit, with the use of the designed standard values or the previously estimated values of the VCM resistance and the equivalent current force constant, and the actual acceleration, the actual velocity, or the actual position of the magnetic head.

FIG. 5 is a flowchart of a saturated acceleration seek process in the magnetic disk apparatus according to the embodiment.

Referring to FIG. 5, the saturated acceleration seek includes an acceleration section, a constant-velocity section, and a deceleration section. The acceleration section has a saturated acceleration section.

In the saturated acceleration section, an estimated head velocity/acceleration acquisition process is executed (S1). In the estimated head velocity/acceleration acquisition process, an observer is used to acquire the estimated velocity $v_{esti}$ and the estimated acceleration $a_{esti}$ of the magnetic head at the time of saturated acceleration. The estimated velocity $v_{esti}$ and the estimated acceleration $a_{esti}$ can be calculated in each sample.

Next, an equivalent current force constant/VCM resistance estimation process is executed (S2). In the equivalent current force constant/VCM resistance estimation process, the estimated velocity $v_{esti}$ and the estimated acceleration $a_{esti}$ are saved in a memory at two or more different sample times in the saturated acceleration section.

During saturated acceleration or later, the VCM resistance $R_{VCM}$ and the equivalent current force constant $K_f$ are estimated based on the estimated velocity $v_{esti}$ and the estimated acceleration $a_{esti}$ at two or more sample times estimated from the position of the magnetic head.

Next, a seek control is performed based on the estimated VCM resistance $R_{VCM}$ and equivalent current force constant $K_f$. The seek control may be performed using the VCM resistance and the equivalent current force constant estimated from the saturated acceleration section or using the VCM resistance and the equivalent current force constant estimated from the deceleration section. Alternatively, the seek control may be performed using the VCM resistance and the equivalent current force constant estimated in a different seek.

For example, during the saturated acceleration seek, it is possible to execute any one of an acceleration section end timing decision process (S3), a constant-velocity control profile creation process (S4), and a deceleration control profile creation process (S5) to reach the target position at the seek destination based on the estimated VCM resistance $R_{VCM}$ and the equivalent current force constant $K_f$.

In the acceleration section end timing decision process, an acceleration section end timing necessary to attain a target state (a target position $p_{tgt}$, a target velocity $v_{tgt}$, and a target acceleration $a_{tgt}$) specified through the constant-velocity section and the deceleration section after the acceleration section is decided.

In the constant-velocity control profile creation process, a constant-velocity control profile necessary to attain the target state (the target position $p_{tgt}$, the target velocity $v_{tgt}$, and the target acceleration $a_{tgt}$) specified through the constant-velocity section and the deceleration section after the acceleration section is decided.

In the deceleration control profile creation process, a deceleration control profile necessary to attain the target state (the target position $p_{tgt}$, the target velocity $v_{tgt}$, and the target acceleration $a_{tgt}$) specified through the constant-velocity section and the deceleration section after the acceleration section is decided.

The decision of the acceleration end timing and the creation of the constant-velocity control profile and the deceleration control profile can be carried out by using the method disclosed in JP-A-5-89613, for example.

Next, in the constant-velocity section, a constant-velocity control process is executed (S6). In the constant-velocity control process, setting the VCM current $I_{VCM}$ to 0 allows the magnetic head to move at a constant velocity toward the seek destination without accelerating or decelerating the magnetic head. In this case, the timing for setting the VCM current $I_{VCM}$ to 0 can be controlled according to the constant-velocity control profile created at S4.

Next, in the deceleration section, a deceleration control process is executed (S7). In the deceleration control process, flowing the VCM current $I_{VCM}$ in a negative direction allows the magnetic head to decelerate toward the seek destination. The positive and negative directions of the VCM current $I_{VCM}$ here refer to the directions in which the VCM current $I_{VCM}$ flows into the coil in the voice coil motor 4. In this case, the value of the VCM current $I_{VCM}$ and the timing for flowing the VCM current $I_{VCM}$ can be controlled according to the deceleration control profile created at S5.

The constant-velocity control process may be omitted depending on the seek distance. For example, in a long seek, the acceleration control process, the constant-velocity control process, and the deceleration control process may be performed, whereas in a short seek, the acceleration control process and the deceleration control process may be performed.

In addition, in a long seek, a saturated acceleration seek control may be performed with 2 degrees of freedom using feedback and feedforward. In a short seek, a seek control may be performed without application of the VCM current $I_{VCM}$ resulting in a voltage over the power supply voltage $V_{sup}$ in the constant current driving circuit. Then, a seek control may be executed such that the seek time of a short seek can be changed based on the VCM resistance $R_{VCM}$ estimated by the saturated acceleration in the long seek.

FIG. 6 is a flowchart of each sample processing during a saturated acceleration seek in the magnetic disk apparatus according to the embodiment. FIG. 6 illustrates a method for determining the saturated acceleration section at each seek.

Referring to FIG. 6, a head position calculation process is executed (S11). In the head position calculation process, the servo pattern recorded on the magnetic disk 2 is read by the read head HR. Then, the position of the magnetic head is demodulated from the servo pattern to determine the present position of the magnetic head over the magnetic disk 2.

Next, a head velocity/acceleration estimation process is executed (S12). In the head velocity/acceleration estimation process, the velocity is determined from the difference in the present position of the magnetic head between the previous sample and the present sample. The present positions of the magnetic head in the previous sample and the present sample can have the value determined at S11. The velocity may be estimated using a linear-state observer for use in a seek control. In addition, the acceleration is determined from the difference in the velocity of the magnetic head between the previous sample and the present sample.

Next, a saturated acceleration section detection process is executed (S13). In the saturated acceleration section detection process, the head state (for example, the position, the velocity, and the acceleration of the magnetic head) in the present sample estimated, from the previous sample and the head state (for example, the position, the velocity, and the acceleration of the magnetic head) in the present sample determined from the present positions of the magnetic head in the previous sample and the present sample are compared to each other.

The head state in the present sample estimated from, the previous sample can have the value determined at S16. The head state determined from the present positions of the magnetic head in the previous sample and the present sample can have the values determined at S11 and S12. Then, it is determined whether there is saturated acceleration based on the presence or absence of divergence between the head states. In this case, the saturated acceleration section can be detected at each seek.

Next, a current indication value decision process is executed (S14). In the current indication value decision process, the current indication value to be applied to the voice coil motor 4 in the present sample is decided based on information such as the target state (for example, the target position, the target velocity, and the target acceleration of the magnetic head) in the next sample and the head state (for example, the position, the velocity, and the acceleration of the magnetic head) in the present sample.

Next, a current indication value application process is executed (S15). In the current indication value application process, the current indication value determined at S14 is set to the motor driver. The motor driver applies the VCM current $I_{VCM}$ to the coil in the voice coil motor 4 based on the current indication value.

Next, a next-sample state estimation process is executed (S16). In the next-sample state estimation process, the head state (for example, the position, the velocity, and the acceleration of the magnetic head) in the next sample is estimated from the head state (for example, the position, the velocity, and the acceleration of the magnetic head) in the present sample and the current indication value. The estimated head state (for example, the position, the velocity, and the acceleration of the magnetic head) can be used in the saturated acceleration section detection process at S13.

FIG. 7A is a schematic block diagram of the foreground of a seek processing system in the magnetic disk apparatus according to the embodiment, and FIG. 7B is a schematic block diagram of the background of the seek processing system in the magnetic disk apparatus according to the embodiment.

In the foreground, the process can be executed in each sample during an acceleration seek. In the background, the process can be executed in a plurality of samples during an acceleration seek.

Referring to FIG. 7A, provided in the foreground of the seek processing system are a state estimation unit 12, an estimated, velocity/acceleration acquisition unit 13, a saturated acceleration section detection unit 14, a current indication value decision unit 15, a current control unit 16, and subtractors E1 to E3. The current control unit 16 has a constant current driving circuit 16A. The current control unit 16 can be provided in the voice coil motor control unit 7B illustrated in FIG. 1B.

Referring to FIG. 7B, provided in the background of the seek processing system are a power supply voltage measurement unit 17, a maximum voltage calculation unit 18, an equivalent current force constant/VCM resistance estimation unit 19, an acceleration section end timing decision unit 20, a constant-velocity control profile creation unit 21, and a deceleration control profile unit 22.

The state estimation unit 12, the estimated velocity/ acceleration acquisition unit 13, the saturated acceleration section detection unit 14, the current indication value decision unit 15, the maximum voltage calculation unit 18, the equivalent current force constant/VCM resistance estimation unit 19, the acceleration section end timing decision unit 20, the constant-velocity control profile creation unit 21, the deceleration control profile unit 22, and the subtractors E1 to E3 can be provided in the hard disk control unit 9 illustrated in FIG. 1E.

A plant 11 can correspond to the voice coil motor 4, the magnetic disk 2, the magnetic head, the head control unit 6, and the read/write channel 8 illustrated, in FIG. 1E. The plant 11 has a head position demodulation unit 11A.

When the sector of the read destination or the write destination is specified by the host HS, the hard disk control unit 9 illustrated in FIG. 1E sets a target position $p_{tgt}$, a target velocity $v_{tgt}$ and a target acceleration $a_{tgt}$ to reach the seek destination. Referring to FIG. 7A, the target acceleration $a_{tgt}$ is input into the current indication value decision unit 15. The target velocity $v_{tgt}$ is input into the subtractor E1. In addition, the estimated velocity $v_{esti}$ is input from the state estimation unit 12 into the subtractor E1. Then, the subtractor E1 subtracts the estimated velocity $v_{esti}$ from the target velocity $v_{tgt}$, and inputs the difference between the target velocity $v_{tgt}$ and the estimated velocity $v_{esti}$ into the current indication value decision unit 15.

The target position $p_{tgt}$ is input into the subtractor E2. In addition, the estimated position $p_{esti}$ is input from the state estimation unit 12 into the subtractor E2. Then, the subtractor E2 subtracts the estimated, position $p_{esti}$ from the target position $p_{tgt}$, and inputs the difference between the target position $p_{tgt}$ and the estimated position $p_{esti}$ into the current indication value decision unit 15.

The current indication value decision unit 15 decides the current indication value $I_{tgt}$ from the target acceleration $a_{tgt}$, the difference between the target velocity $v_{tgt}$ and the estimated velocity $v_{esti}$, and the difference between the target position $p_{tgt}$ and the estimated position $p_{esti}$. The current indication, value $I_{tgt}$ is input into the state estimation unit 12 and the current control unit 16.

When the current indication value $I_{tgt}$ is input into the current control unit 16, the constant current driving circuit 16A applies the VCM current $I_{VCM}$ corresponding to the current indication value $I_{tgt}$ to the coil in the voice coil motor 4. In, the saturated acceleration section, the current indication value $I_{tgt}$ is given to operate the constant current driving circuit 16A in the voice coil motor 4 such that the VCM voltage $V_{VCM}$ exceeds the maximum applicable VCM voltage $V_{VCM\_lim}$. Along with the limitation of the VCM voltage $V_{VCM}$ by the maximum applicable VCM voltage $V_{VCM\_lim}$, the VCM current $I_{VCM}$ is limited as well.

At that time, the magnetic head can seek over the magnetic disk 2 in the plant 11. Then, the servo pattern recorded on the magnetic disk 2 is read via the read head HR. The head position demodulation unit 11A, demodulates the position of the magnetic head from the servo pattern to calculate the present position $p_{dm}$ of the magnetic head.

The present position $p_{dm}$ of the magnetic head is input into the subtractor E3. In addition, the estimated position $p_{esti}$ is input from the state estimation unit 12 into the subtractor E1. Then, the subtractor E3 subtracts the estimated position $p_{esti}$ from the present position $p_{dm}$ to calculate an estimated position error $p_{err}$. The estimated position error $p_{err}$ is input into the state estimation unit 12 and the saturated acceleration section detection unit 14.

The state estimation unit 12 calculates the estimated position $p_{esti}$, the estimated velocity $v_{esti}$, and the estimated acceleration $a_{esti}$ of the magnetic head based on the current indication value $I_{tgt}$ and the estimated position error $p_{err}$. In this case, the state estimation unit 12 can provide feedback such that the estimated position error $p_{err}$ converges on 0 in a saturated acceleration seek. The estimated position $p_{esti}$ is input into the subtractor E3. The estimated velocity $v_{esti}$ is input into the subtractor E1 and the estimated velocity/acceleration acquisition unit 13. The estimated acceleration $a_{esti}$ is input into the estimated velocity/acceleration acquisition unit 13.

The saturated acceleration section detection unit 14 compares the estimated position error $p_{err}$ to a threshold value. Then, the saturated acceleration section detection unit 14 detects the saturated acceleration section from the time when the estimated position error $p_{err}$ agrees with the threshold. That is, in the saturated acceleration section, there is divergence between the current indication value $I_{tgt}$ and the VCM current $I_{VCM}$ actually flowing through the VCM, and the estimated position error $p_{err}$ does not become 0. Accordingly, the saturated acceleration, section, can, be determined by monitoring whether the estimated position error $p_{err}$ falls within the range of the threshold and detecting the time when the estimated position error $p_{err}$ agrees with the threshold. When the saturated acceleration section is detected, the saturated acceleration section detection unit 14 sends a flag f_SatuAcc for notifying the saturated acceleration section to the estimated velocity/acceleration acquisition unit 13.

Upon receipt of the flag f_SatuAcc from the saturated acceleration section detection unit 14, the estimated velocity/acceleration acquisition unit 13 acquires accelerations $a_1$ and $a_2$ and velocities $v_1$ and $v_2$ at positions $x_1$ and $x_2$ of the magnetic head at times $t_1$ and $t_2$ in the saturated acceleration section. The accelerations $a_1$ and $a_2$ and the velocities $v_1$ and $v_2$ are input into the equivalent current force constant/VCM resistance estimation unit 19 as illustrated in FIG. 7B.

Meanwhile, referring to FIG. 7B, the power supply voltage measurement unit 17 measures the power supply voltage $V_{sup}$ and inputs the same into the maximum voltage calculation unit 18. The maximum voltage calculation unit 18 calculates the maximum applicable VCM voltage $V_{VCM\_lim}$ based on the power supply voltage $V_{sup}$ and inputs the same into the equivalent current force constant/VCM resistance estimation unit 19.

The equivalent current force constant/VCM resistance estimation unit 19 calculates the VCM resistance $R_{VCM}$ and the equivalent current force constant $K_f$ based on the accelerations $a_1$ and $a_2$, the velocities $v_1$ and $v_2$, and the maximum applicable VCM voltage $V_{VCM\_lim}$. The VCM resistance $R_{VCM}$ and the equivalent current force constant $K_f$ can be calculated by Equations (11) and (12).

The VCM resistance $R_{VCM}$ and the equivalent current force constant $K_f$ are input into the acceleration section end timing decision unit 20, the constant-velocity control profile creation unit 21, and the deceleration control profile unit 22.

The acceleration section end timing decision unit 20 decides an acceleration section end timing necessary to attain the target position $p_{tgt}$, the target velocity and the target acceleration $a_{tgt}$ specified through the constant-velocity section and the deceleration section after the acceleration section based on the VCM resistance $R_{VCM}$ and the equivalent current force constant $K_f$.

The constant-velocity control profile creation unit 21 creates a constant-velocity control profile necessary to attain the target position $p_{tgt}$, the target velocity $v_{tgt}$, and the target acceleration $a_{tgt}$ specified through the constant-velocity section and the deceleration section after the acceleration section based on the VCM resistance $R_{VCM}$ and the equivalent current force constant $K_f$.

The deceleration control profile unit 22 creates the deceleration control profile necessary to attain the target position $p_{tgt}$, the target velocity $v_{tgt}$, and the target acceleration $a_{tgt}$ specified through the constant-velocity section and the deceleration section after the acceleration section based on the VCM resistance $R_{VCM}$ and the equivalent current force constant $K_f$.

By setting the profiles of the VCM current at a seek time based on the VCM resistance and the equivalent current force constant of the voice coil motor 4, it is possible to reduce instability in seek control resulting from changes in the VCM resistance due to self-heat generation at a seek time or changes in the equivalent current force constant due to variations among components and environmental changes, and enhance the efficiency of designing of current application to the voice coil motor 4, thereby shortening the seek time.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk apparatus comprising:
   a magnetic disk;
   a magnetic head that accesses the magnetic disk;
   a voice coil motor that drives the magnetic head over the magnetic disk;
   a driving circuit that applies a VCM current to the voice coil motor;
   a VCM resistance estimation unit that estimates a VCM resistance in the voice coil motor based on an acceleration and a velocity of the magnetic head with a VCM voltage saturated; and
   an equivalent current force constant estimation unit that estimates an equivalent current force constant of the voice coil motor based on the acceleration and the velocity of the magnetic head with the VCM voltage saturated.

2. The magnetic disk apparatus of claim 1, wherein, when the VCM resistance is designated as $R_{VCM}$, the equivalent current force constant is designated as $K_f$, an equivalent mass of an arm on which the magnetic head is mounted is designated as m, and a maximum applicable VCM voltage with the VCM voltage saturated is designated as $V_{VCM\_lim}$, the accelerations of the magnetic head at sample times $t_1$, and $t_2$ are designated as $a_1$ and $a_2$, and the velocities of the magnetic head at sample times $t_1$ and $t_2$ are designated as $v_1$ and $v_2$, the VCM resistance $R_{VCM}$ and the equivalent current force constant $K_f$ are given by the equations:

$$R_{VCM}=(a_1-a_2)(v_1-v_2)/(a_1 \cdot v_2-a_2 \cdot v_1)^2 \cdot V^2_{VCM\_lim}/m$$

$$K_f=(a_1-a_2)/(a_1 \cdot v_2-a_2 \cdot v_1) \cdot V_{VCM\_lim}.$$

3. The magnetic disk apparatus of claim 1, wherein a current indication value is given to operate the driving circuit such that the VCM voltage exceeds the maximum applicable VCM voltage.

4. The magnetic disk apparatus of claim 3, wherein, when a power supply voltage is designated as $V_{sup}$ and a voltage drop due to a circuit resistance is designated as $V_{drop}$, the maximum applicable VCM voltage $V_{VCM\_lim}$ is given by the equation $V_{VCM\_lim}=V_{sup}-V_{drop}$.

5. The magnetic disk apparatus of claim 3, wherein the VCM current with the VCM voltage saturated diverges from the current indication value.

6. The magnetic disk apparatus of claim 5, comprising:
   a head position demodulation unit that demodulates a position of the magnetic head based on a servo pattern read by the magnetic head from the magnetic disk; and
   a state estimation unit that estimates the position, the velocity, and the acceleration of the magnetic head based on the current indication value of the voice coil motor and provides feedback such that the difference between the position of the magnetic head demodulated by the head position demodulation unit and the estimated position converges on 0.

7. The magnetic disk apparatus of claim 6, comprising a saturated acceleration section detection unit that detects the saturated state of the VCM voltage based on the position of the magnetic head demodulated by the head position demodulation unit and the position estimated by the state estimation unit.

8. The magnetic disk apparatus of claim 7, wherein the saturated acceleration section detection unit determines a section with the VCM voltage saturated by detecting a time when the difference between the position of the magnetic head demodulated by the head position demodulation unit and the position estimated by the state estimation unit agrees with a threshold.

9. The magnetic disk apparatus of claim 8, comprising an estimated velocity/acceleration acquisition unit that acquires the acceleration and the velocity of the magnetic head estimated by the state estimation unit in the section with the VCM voltage saturated, wherein
   the VCM resistance estimation unit estimates the VCM resistance in the voice coil motor based on the acceleration and the velocity of the magnetic head acquired by the estimated velocity/acceleration acquisition unit, and
   the equivalent current force constant estimation unit estimates the equivalent current force constant in the voice coil motor based on the acceleration and the velocity of the magnetic head acquired by the estimated velocity/acceleration acquisition unit.

10. The magnetic disk apparatus of claim 6, comprising:
    a current indication value decision unit that decides the current indication value based on a target acceleration the difference between a target velocity and the velocity estimated by the state estimation unit, and the difference between a target position and the position estimated by the state estimation unit; and
    a current control unit that applies the VCM current to the voice coil motor based on the current indication value.

11. The magnetic disk apparatus of claim 1, further comprising a seek control unit that performs a seek control based on the VCM resistance and the equivalent current force constant of the voice coil motor.

12. The magnetic disk apparatus of claim 11, wherein the seek control unit executes in a saturated acceleration seek at least one of an acceleration end timing decision process, a constant-velocity control profile creation process, and a deceleration control profile creation process to reach a target position at the seek destination, based on the VCM resistance and the equivalent current force constant of the voice coil motor.

13. The magnetic disk apparatus of claim 12, wherein the saturated acceleration seek includes an acceleration section, a constant-velocity section, and a deceleration section, and the acceleration section has a saturated acceleration section with the VCM voltage saturated.

14. The magnetic disk apparatus of claim 13, wherein the seek control unit executes:
  an acceleration control process to accelerate the magnetic head toward a seek destination in the acceleration section;
  a constant-velocity control process to move the magnetic head toward the seek destination at a constant velocity in the constant-velocity section, and
  a deceleration control process to decelerate the magnetic head toward the seek destination in the deceleration section.

15. The magnetic disk apparatus of claim 13, wherein
  the velocity and the acceleration of the magnetic head are acquired in the saturated acceleration section,
  the VCM resistance and the equivalent current force constant of the voice coil motor are estimated based on the velocity and the acceleration of the magnetic head in the acceleration section, and
  an acceleration end timing decision process, a constant-velocity control profile creation process, and a deceleration control profile creation process are executed to reach a target position at a seek destination based on the estimated VCM resistance and equivalent current force constant in the acceleration section.

16. The magnetic disk apparatus of claim 13, wherein, in the acceleration end timing decision process, an acceleration section end timing necessary to attain a target position, a target velocity, and a target acceleration specified through the constant-velocity section and the deceleration section after the acceleration section is decided.

17. The magnetic disk apparatus of claim 13, wherein, in the constant-velocity control profile creation process, a constant-velocity control profile necessary to attain a target position, a target velocity, and a target acceleration specified through the constant-velocity section and the deceleration section after the acceleration section is created.

18. The magnetic disk apparatus of claim 13, wherein, in the deceleration control profile creation process, a deceleration control profile necessary to attain a target position, a target velocity, and a target acceleration specified through the constant-velocity section and the deceleration section after the acceleration section is created.

19. The magnetic disk apparatus of claim 12, executing in the saturated acceleration seek:
  a head position calculation process to demodulate the position of the magnetic head based on a servo pattern read by the magnetic head from the magnetic disk;
  a head velocity/acceleration estimation process to calculate the velocity and the acceleration in the present sample determined from the positions of the magnetic head in the previous sample and the present sample calculated in the head position calculation process;
  a saturated acceleration section detection process to detect a section with the VCM voltage saturated based on results of comparison between the velocity and the acceleration in the present sample calculated in the head velocity/acceleration estimation process and the velocity and the acceleration in the present sample estimated from the previous sample;
  a current indication value decision process to decide the current indication value based on the target position, the target velocity, and the target acceleration of the magnetic head in the next sample and the position and the velocity of the magnetic head in the present sample;
  a current application process to apply the VCM current to the voice coil motor based on the current indication value; and
  a next-sample state estimation process to estimate the velocity and the acceleration of the magnetic head in the next sample based on the current indication value, and
  the velocity and the acceleration in the present sample estimated from the previous sample in the saturated acceleration section detection process are the velocity and the acceleration in the next sample estimated in the next-sample state estimation process.

* * * * *